(12) United States Patent
Raichelgauz et al.

(10) Patent No.: US 11,657,079 B2
(45) Date of Patent: May 23, 2023

(54) SYSTEM AND METHOD FOR IDENTIFYING SOCIAL TRENDS

(71) Applicants: Igal Raichelgauz, Tel Aviv (IL); Karina Odinaev, Tel Aviv (IL); Yehoshua Y. Zeevi, Haifa (IL)

(72) Inventors: Igal Raichelgauz, Tel Aviv (IL); Karina Odinaev, Tel Aviv (IL); Yehoshua Y. Zeevi, Haifa (IL)

(73) Assignee: Cortica Ltd., Tel Aviv (IL)

( * ) Notice: Subject to any disclaimer, the term of this patent is extended or adjusted under 35 U.S.C. 154(b) by 556 days.

(21) Appl. No.: 16/699,037

(22) Filed: Nov. 28, 2019

(65) Prior Publication Data

US 2020/0193308 A1   Jun. 18, 2020

Related U.S. Application Data

(63) Continuation of application No. 14/811,219, filed on Jul. 28, 2015, now abandoned.
(Continued)

(51) Int. Cl.
*G06N 5/02* (2006.01)
*G06F 16/28* (2019.01)
(Continued)

(52) U.S. Cl.
CPC ............ *G06F 16/284* (2019.01); *G06F 3/048* (2013.01); *G06F 3/0484* (2013.01); *G06F 3/0488* (2013.01); *G06F 16/14* (2019.01); *G06F 16/152* (2019.01); *G06F 16/172* (2019.01); *G06F 16/1748* (2019.01); *G06F 16/2228* (2019.01); *G06F 16/285* (2019.01); *G06F 16/35* (2019.01); *G06F 16/40* (2019.01); *G06F 16/41* (2019.01); *G06F 16/43* (2019.01); *G06F 16/433* (2019.01);
(Continued)

(58) Field of Classification Search
None
See application file for complete search history.

(56) References Cited

U.S. PATENT DOCUMENTS 6,640,015 B1   10/2003  Lafruit
7,801,893 B2   9/2010   Gulli
(Continued)

OTHER PUBLICATIONS

Yanagawa, Akira, et al. "Columbia university's baseline detectors for 374 Iscom semantic visual concepts." Columbia University ADVENT technical report (2007): 222-2006. (Year: 2007).*
(Continued)

*Primary Examiner* — Daniel T Pellett
(74) *Attorney, Agent, or Firm* — Reches Patents

(57) ABSTRACT

A method and system for identifying social trends are provided. The method includes collecting multimedia content from a plurality of data sources; gathering environmental variables related to the collected multimedia content; extracting visual elements from the collected multimedia content; generating at least one signature for each extracted visual element; generating at least one cluster of visual elements by clustering at least similar signatures generated for the extracted visual elements; correlating environmental variables related to visual elements in the at least one cluster; determining at least one social trend by associating the correlated environmental variables with the at least one cluster.

20 Claims, 4 Drawing Sheets

Related U.S. Application Data

(60) Provisional application No. 62/030,079, filed on Jul. 29, 2014.

(51) Int. Cl.

| | |
|---|---|
| *G06F 16/41* | (2019.01) |
| *G06F 16/432* | (2019.01) |
| *G06F 16/683* | (2019.01) |
| *G06F 16/783* | (2019.01) |
| *G10L 15/26* | (2006.01) |
| *G06F 16/40* | (2019.01) |
| *G06F 16/43* | (2019.01) |
| *G06F 16/438* | (2019.01) |
| *G06F 3/048* | (2013.01) |
| *G06T 19/00* | (2011.01) |
| *H04H 20/10* | (2008.01) |
| *H04H 20/26* | (2008.01) |
| *H04H 60/37* | (2008.01) |
| *H04H 60/46* | (2008.01) |
| *H04H 60/56* | (2008.01) |
| *H04H 60/66* | (2008.01) |
| *H04L 67/10* | (2022.01) |
| *H04N 7/173* | (2011.01) |
| *H04N 21/258* | (2011.01) |
| *H04N 21/2668* | (2011.01) |
| *H04N 21/466* | (2011.01) |
| *H04N 21/81* | (2011.01) |
| *G06F 16/904* | (2019.01) |
| *G06F 16/35* | (2019.01) |
| *G06F 16/51* | (2019.01) |
| *G06N 5/025* | (2023.01) |
| *G06F 16/22* | (2019.01) |
| *G06F 16/174* | (2019.01) |
| *G06F 16/48* | (2019.01) |
| *G06F 16/951* | (2019.01) |
| *G06F 16/172* | (2019.01) |
| *G06F 16/14* | (2019.01) |
| *G06F 16/487* | (2019.01) |
| *G06Q 30/0242* | (2023.01) |
| *G06Q 30/0251* | (2023.01) |
| *H04H 60/59* | (2008.01) |
| *H04L 67/306* | (2022.01) |
| *G06N 5/04* | (2023.01) |
| *G06Q 30/0201* | (2023.01) |
| *H04H 60/49* | (2008.01) |
| *H04H 60/71* | (2008.01) |
| *G09B 19/00* | (2006.01) |
| *G06F 16/435* | (2019.01) |
| *G06N 7/00* | (2023.01) |
| *G06F 16/955* | (2019.01) |
| *G06F 40/134* | (2020.01) |
| *G06F 3/0484* | (2022.01) |
| *G06F 3/0488* | (2022.01) |
| *H04H 20/93* | (2008.01) |
| *H04H 60/33* | (2008.01) |
| *H04H 60/58* | (2008.01) |
| *G06N 20/00* | (2019.01) |
| *G06F 16/738* | (2019.01) |
| *G06F 17/16* | (2006.01) |
| *G06N 3/063* | (2023.01) |
| *G06F 16/9535* | (2019.01) |
| *H04L 67/02* | (2022.01) |
| *G06V 20/40* | (2022.01) |
| *G06V 40/16* | (2022.01) |
| *H04L 65/75* | (2022.01) |
| *H04L 67/63* | (2022.01) |
| *H04L 67/50* | (2022.01) |
| *G10L 15/32* | (2013.01) |

(52) U.S. Cl.
CPC ......... *G06F 16/434* (2019.01); *G06F 16/435* (2019.01); *G06F 16/438* (2019.01); *G06F 16/4393* (2019.01); *G06F 16/48* (2019.01); *G06F 16/487* (2019.01); *G06F 16/51* (2019.01); *G06F 16/683* (2019.01); *G06F 16/685* (2019.01); *G06F 16/739* (2019.01); *G06F 16/783* (2019.01); *G06F 16/7834* (2019.01); *G06F 16/7844* (2019.01); *G06F 16/7847* (2019.01); *G06F 16/904* (2019.01); *G06F 16/951* (2019.01); *G06F 16/9535* (2019.01); *G06F 16/9558* (2019.01); *G06F 17/16* (2013.01); *G06F 40/134* (2020.01); *G06N 3/063* (2013.01); *G06N 5/02* (2013.01); *G06N 5/025* (2013.01); *G06N 5/04* (2013.01); *G06N 7/005* (2013.01); *G06N 20/00* (2019.01); *G06Q 30/0201* (2013.01); *G06Q 30/0246* (2013.01); *G06Q 30/0261* (2013.01); *G06T 19/006* (2013.01); *G06V 20/40* (2022.01); *G06V 20/46* (2022.01); *G06V 40/171* (2022.01); *G09B 19/0092* (2013.01); *G10L 15/26* (2013.01); *H04H 20/103* (2013.01); *H04H 20/26* (2013.01); *H04H 20/93* (2013.01); *H04H 60/33* (2013.01); *H04H 60/37* (2013.01); *H04H 60/46* (2013.01); *H04H 60/49* (2013.01); *H04H 60/56* (2013.01); *H04H 60/58* (2013.01); *H04H 60/59* (2013.01); *H04H 60/66* (2013.01); *H04H 60/71* (2013.01); *H04L 65/75* (2022.05); *H04L 67/02* (2013.01); *H04L 67/10* (2013.01); *H04L 67/306* (2013.01); *H04L 67/535* (2022.05); *H04L 67/63* (2022.05); *H04N 7/17318* (2013.01); *H04N 21/25891* (2013.01); *H04N 21/2668* (2013.01); *H04N 21/466* (2013.01); *H04N 21/8106* (2013.01); *G06V 2201/10* (2022.01); *G10L 15/32* (2013.01); *H04H 2201/90* (2013.01); *Y10S 707/99943* (2013.01); *Y10S 707/99948* (2013.01)

(56) References Cited

U.S. PATENT DOCUMENTS

| | | |
|---|---|---|
| 8,275,764 B2 | 9/2012 | Jeon |
| RE44,225 E | 5/2013 | Aviv |
| 8,527,978 B1 | 9/2013 | Sallam |
| 8,634,980 B1 | 1/2014 | Urmson |
| 8,781,152 B2 | 7/2014 | Momeyer |
| 8,782,077 B1 | 7/2014 | Rowley |
| 9,298,763 B1 | 3/2016 | Zack |
| 9,440,647 B1 | 9/2016 | Sucan |
| 9,734,533 B1 | 8/2017 | Givot |
| 10,133,947 B2 | 11/2018 | Yang |
| 10,347,122 B2 | 7/2019 | Takenaka |
| 10,491,885 B1 | 11/2019 | Hicks |
| 2003/0037010 A1 | 2/2003 | Schmelzer |
| 2004/0059736 A1 | 3/2004 | Willse |
| 2004/0091111 A1 | 5/2004 | Levy |
| 2004/0230572 A1 | 11/2004 | Omoigui |
| 2005/0193015 A1 | 9/2005 | Logston |
| 2006/0100987 A1 | 5/2006 | Leurs |
| 2006/0120626 A1 | 6/2006 | Perlmutter |
| 2006/0251339 A1 | 11/2006 | Gokturk |
| 2007/0196013 A1 | 8/2007 | Li |
| 2007/0255785 A1* | 11/2007 | Hayashi ............ H04W 4/21 709/204 |

(56) References Cited

U.S. PATENT DOCUMENTS

| | | | |
|---|---|---|---|
| 2008/0109433 A1 | 5/2008 | Rose | |
| 2008/0152231 A1 | 6/2008 | Gokturk | |
| 2008/0166020 A1 | 7/2008 | Kosaka | |
| 2008/0270569 A1 | 10/2008 | McBride | |
| 2008/0294278 A1 | 11/2008 | Borgeson | |
| 2009/0022472 A1 | 1/2009 | Bronstein | |
| 2009/0024641 A1* | 1/2009 | Quigley | G06F 16/907 |
| 2009/0034791 A1 | 2/2009 | Doretto | |
| 2009/0043818 A1 | 2/2009 | Raichelgauz | |
| 2009/0080759 A1 | 3/2009 | Bhaskar | |
| 2009/0216761 A1 | 8/2009 | Raichelgauz | |
| 2009/0278934 A1 | 11/2009 | Ecker | |
| 2010/0042646 A1 | 2/2010 | Raichelqauz | |
| 2010/0082684 A1 | 4/2010 | Churchill | |
| 2010/0111408 A1 | 5/2010 | Matsuhira | |
| 2010/0306193 A1 | 12/2010 | Pereira | |
| 2011/0029620 A1 | 2/2011 | Bonforte | |
| 2011/0038545 A1 | 2/2011 | Bober | |
| 2011/0246566 A1 | 10/2011 | Kashef | |
| 2012/0133497 A1 | 5/2012 | Sasaki | |
| 2012/0179751 A1 | 7/2012 | Ahn | |
| 2013/0103814 A1 | 4/2013 | Carrasco | |
| 2013/0212493 A1 | 8/2013 | Krishnamurthy | |
| 2013/0226820 A1 | 8/2013 | Sedota, Jr. | |
| 2014/0025692 A1 | 1/2014 | Pappas | |
| 2014/0059443 A1 | 2/2014 | Tabe | |
| 2014/0095425 A1 | 4/2014 | Sipple | |
| 2014/0111647 A1 | 4/2014 | Atsmon | |
| 2014/0201330 A1 | 7/2014 | Lozano Lopez | |
| 2014/0379477 A1 | 12/2014 | Sheinfeld | |
| 2015/0033150 A1 | 1/2015 | Lee | |
| 2015/0117784 A1 | 4/2015 | Lin | |
| 2015/0134688 A1 | 5/2015 | Jing | |
| 2015/0363644 A1 | 12/2015 | Wnuk | |
| 2016/0210525 A1 | 7/2016 | Yang | |
| 2016/0221592 A1 | 8/2016 | Puttagunta | |
| 2016/0342683 A1 | 11/2016 | Kwon | |
| 2016/0357188 A1 | 12/2016 | Ansari | |
| 2017/0032257 A1 | 2/2017 | Sharifi | |
| 2017/0041254 A1 | 2/2017 | Agara Venkatesha Rao | |
| 2017/0109602 A1 | 4/2017 | Kim | |
| 2017/0255620 A1 | 9/2017 | Raichelgauz | |
| 2017/0262437 A1 | 9/2017 | Raichelgauz | |
| 2017/0323568 A1 | 11/2017 | Inoue | |
| 2018/0081368 A1 | 3/2018 | Watanabe | |
| 2018/0101177 A1 | 4/2018 | Cohen | |
| 2018/0157916 A1 | 6/2018 | Doumbouya | |
| 2018/0158323 A1 | 6/2018 | Takenaka | |
| 2018/0204111 A1 | 7/2018 | Zadeh | |
| 2019/0005726 A1 | 1/2019 | Nakano | |
| 2019/0039627 A1 | 2/2019 | Yamamoto | |
| 2019/0043274 A1 | 2/2019 | Hayakawa | |
| 2019/0045244 A1 | 2/2019 | Balakrishnan | |
| 2019/0056718 A1 | 2/2019 | Satou | |
| 2019/0065951 A1 | 2/2019 | Luo | |
| 2019/0188501 A1 | 6/2019 | Ryu | |
| 2019/0220011 A1 | 7/2019 | Della Penna | |
| 2019/0317513 A1 | 10/2019 | Zhang | |
| 2019/0364492 A1 | 11/2019 | Azizi | |
| 2019/0384303 A1 | 12/2019 | Muller | |
| 2019/0384312 A1 | 12/2019 | Herbach | |
| 2019/0385460 A1 | 12/2019 | Magzimof | |
| 2019/0389459 A1 | 12/2019 | Berntorp | |
| 2020/0004248 A1 | 1/2020 | Healey | |
| 2020/0004251 A1 | 1/2020 | Zhu | |
| 2020/0004265 A1 | 1/2020 | Zhu | |
| 2020/0005631 A1 | 1/2020 | Visintainer | |
| 2020/0018606 A1 | 1/2020 | Wolcott | |
| 2020/0018618 A1 | 1/2020 | Ozog | |
| 2020/0020212 A1 | 1/2020 | Song | |
| 2020/0050973 A1 | 2/2020 | Stenneth | |
| 2020/0073977 A1 | 3/2020 | Montemerlo | |
| 2020/0090484 A1 | 3/2020 | Chen | |
| 2020/0097756 A1 | 3/2020 | Hashimoto | |
| 2020/0133307 A1 | 4/2020 | Kelkar | |
| 2020/0043326 A1 | 6/2020 | Tao | |

OTHER PUBLICATIONS

Vallet, David, et al. "Personalized content retrieval in context using ontological knowledge." IEEE Transactions on circuits and systems for video technology 17.3 (2007): 336-346. (Year: 2007).*

Jasinschi et al., A Probabilistic Layered Framework for Integrating Multimedia Content and Context Information, 2002, IEEE, p. 2057-2060. (Year: 2002).

Jones et al., "Contextual Dynamics of Group-Based Sharing Decisions", 2011, University of Bath, p. 1777-1786. (Year: 2011).

Iwamoto, "Image Signature Robust to Caption Superimpostion for Video Sequence Identification", IEEE, pp. 3185-3188 (Year: 2006).

Cooperative Multi-Scale Convolutional Neural, Networks for Person Detection, Markus Eisenbach, Daniel Seichter, Tim Wengefeld, and Horst-Michael Gross Ilmenau University of Technology, Neuroinformatics and Cognitive Robotics Lab (Year; 2016).

Chen, Yixin, James Ze Wang, and Robert Krovetz. "CLUE: cluster-based retrieval of images by unsupervised learning." IEEE transactions on Image Processing 14.8 (2005); 1187-1201. (Year: 2005).

Wusk et al (Non-Invasive detection of Respiration and Heart Rate with a Vehicle Seat Sensor; www.mdpi.com/journal/sensors; Published: May 8, 2018). (Year: 2018).

Chen, Tiffany Yu-Han, et al. "Glimpse: Continuous, real-time object recognition on mobile devices." Proceedings of the 13th ACM Confrecene on Embedded Networked Sensor Systems. 2015. (Year: 2015).

* cited by examiner

US 11,657,079 B2

SYSTEM AND METHOD FOR IDENTIFYING SOCIAL TRENDS

CROSS-REFERENCE TO RELATED APPLICATIONS

This application claims the benefit of U.S. Provisional Application 62/030,079 filed on Jul. 29, 2014. This application is also a continuation-in-part (CIP) of U.S. patent application Ser. No. 13/874,115, filed on Apr. 30, 2013. The Ser. No. 13/874,115 application is a CIP of U.S. patent application Ser. No. 13/624,397 filed on Sep. 21, 2012. The Ser. No. 13/624,397 application is a CIP application of:

(a) U.S. patent application Ser. No. 13/344,400 filed on Jan. 5, 2012, now U.S. Pat. No. 8,959,037, which is a continuation of U.S. patent application Ser. No. 12/434,221, filed May 1, 2009, now U.S. Pat. No. 8,112,376;

(b) U.S. patent application Ser. No. 12/195,863, filed Aug. 21, 2008, now U.S. Pat. No. 8,326,775, which claims priority under 35 USC 119 from Israeli Application No. 185414, filed on Aug. 21, 2007, and which is also a continuation-in-part of the below-referenced U.S. patent application Ser. No. 12/084,150; and, (c) U.S. patent application Ser. No. 12/084,150 having a filing date of Apr. 7, 2009, which is the National Stage of International Application No. PCT/IL2006/001235, filed on Oct. 26, 2006, which claims foreign priority from Israeli Application No. 171577 filed on Oct. 26, 2005 and Israeli Application No. 173409 filed on 29 Jan. 2006. All of the applications referenced above are herein incorporated by reference for all that they contain.

TECHNICAL FIELD

The present disclosure relates generally to the analysis of multimedia content, and more specifically to a system for identifying social trends in data sources respective of multimedia content.

BACKGROUND

There is an abundance of information available on the Internet in the form of content on webpages, social networks, as well as other sources of information which are accessible via the world-wide web (WWW). The content displayed on the Internet is typically accompanied by advertisements. Current solutions utilized by advertisers try to target an audience based on general preferences, for example, their age and music preferences, rather than capturing the target audience's true intent.

Therefore, such advertisers usually do not have the tools to understand social trends related to a human behavior as they are expressed dynamically. Advertisers usually target a demographic of users based on very raw data, such as explicit and implicit demographic information related to the user. Such raw data is usually generic, and therefore the advertisements provided do not sufficiently match a user's true intent. As a result, advertisements which do not sufficiently match a user's true intent generate less revenue. Therefore, current solutions for targeting advertisements based merely on demographics do not efficiently utilize an advertiser's budget.

SUMMARY

A summary of several exemplary embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

Certain embodiments include a method for identifying social trends. The method comprises: collecting multimedia content from a plurality of data sources; gathering environmental variables related to the collected multimedia content; extracting visual elements from the collected multimedia content; generating at least one signature for each extracted visual element; generating at least one cluster of visual elements by clustering at least similar signatures generated for the extracted visual elements; correlating environmental variables related to visual elements in the at least one cluster; determining at least one social trend by associating the correlated environmental variables with the at least one cluster.

Certain embodiments include a system for identifying social trends. The system comprises: a processing unit; and a memory coupled to the processing unit, the memory contains instructions that when executed by the processing unit configures the system to: collect multimedia content from a plurality of data sources; gather environmental variables related to the collected multimedia content; extract visual elements from the collected multimedia content; generate at least one signature for each extracted visual element; generate at least one cluster of visual elements by clustering at least similar signatures generated for the extracted visual elements; correlate environmental variables related to visual elements in the at least one cluster; determine at least one social trend by associating the correlated environmental variables with the at least one cluster.

BRIEF DESCRIPTION OF THE DRAWINGS

The subject matter that is regarded as the disclosed embodiments is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
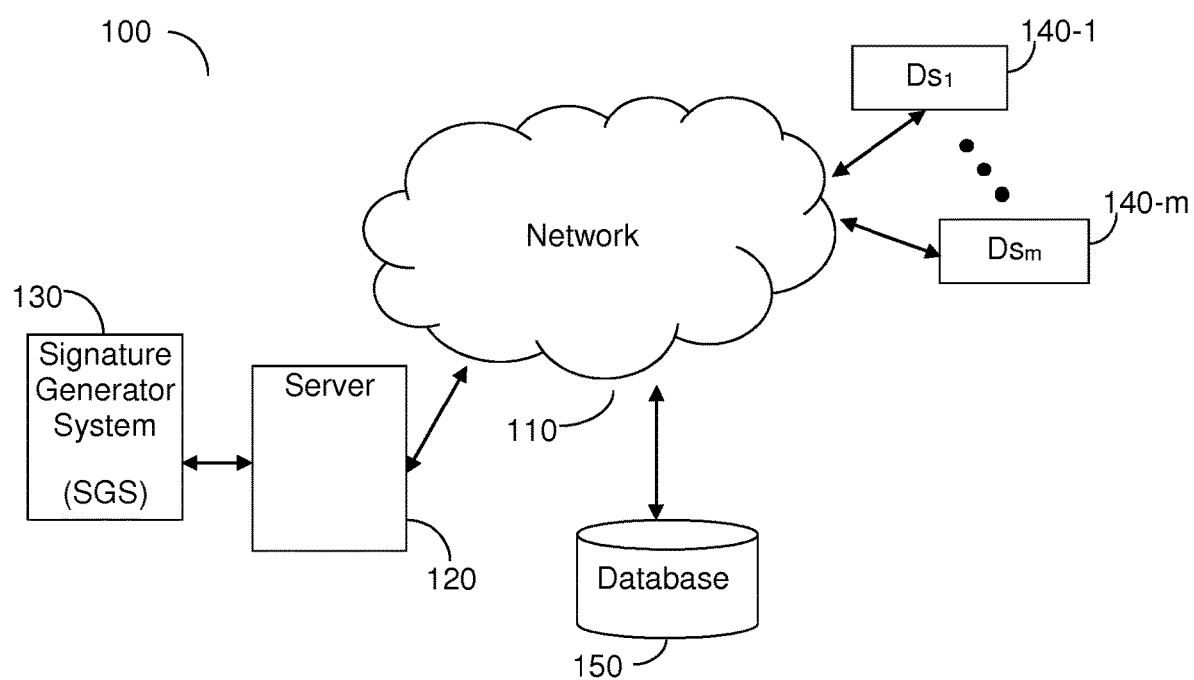
FIG. 1 is a schematic block diagram of a networked system utilized to describe the various disclosed embodiments.

It is important to note that the embodiments disclosed herein are merely examples of the many advantageous uses of the innovative teachings herein. In general, statements made in the specification of the present application do not necessarily limit any of the various claimed embodiments.

Moreover, some statements may apply to some inventive features but not to others. In general, unless otherwise indicated, singular elements may be in plural and vice versa with no loss of generality. In the drawings, like numerals refer to like parts through several views.

FIG. 1 shows an exemplary and non-limiting schematic diagram of a networked system 100 utilized to describe the various disclosed embodiments. As illustrated in FIG. 1, a network 110 enables communication between different parts of the system 100. The network 110 may be the Internet, the world-wide-web (WWW), a local area network (LAN), a wide area network (WAN), a metro area network (MAN), and other networks capable of enabling communication between the elements of the system 100.

The networked system 100 includes a plurality of data sources 140-1 through 140-m (collectively referred to hereinafter as data sources 140 or individually as a data source 140) communicatively connected to the network 110. A data source 140 is a source of multimedia content. Each of the data sources 140 may be, for example, a web server (hosting a website), an application server, a data repository, and the like. Multimedia content may be, but is not limited to, text, video, audio, a combination thereof, and the like. As an example, a multimedia content may be in a form of a webpage including text, images, and video clips. Also connected to the network 110 is a database 150 that is configured to store multimedia content extracted from the data sources 140 as well as store social trends determined according to the disclosed embodiments.

The various embodiments disclosed herein are realized using a server 120 and a signature generator system (SGS) 130, both of which are communicatively connected to the network 110. In some implementations, the SGS 130 is directly connected to the server 120. According to some embodiments, the server 120 is configured to search through the data sources 140 in order to collect multimedia content therefrom. The collection can be performed through a crawling process targeting a website (e.g., social media website) or data sources 140 located or catered to a specific geographic.

The server 120 is configured to analyze multimedia content collected through the crawling process to identify and extract visual elements displayed therein. A visual element may be, for example, an image, a graphic, a video stream, a video clip, a video frame, a photograph, and/or combinations thereof and portions thereof.

The server 120 is configured to query the SGS 130 to generate at least one signature for each of the visual elements. The generated signature(s) may be robust to noise and distortions as discussed below. The process for generating the signatures is explained in more detail herein below with respect to FIGS. 3 and 4. The generated signature(s) may be robust to noise and distortions as discussed below.

The server 120 is further configured to collect environmental variables associated with the collected multimedia content. An environmental variable may be, for example and not by way of limitation, a location variable, a weather variable, a time variable, a speed variable, a motion variable, or any information that can related to the multimedia content to the user uploaded/shared such content. For example, the location variable is a location of the user uploaded/shared the content, a location from where the content is uploaded/shared, a location related to the content itself, and so on. The variable information can be obtained from a device of a user, a data source maintaining the content, and an external source (e.g., a weather information service, a Geo location system, etc.). The variables from a user device can be obtained through sensors installed in the device. The sensors may include GPS, clocks, accelerometers, compasses, and other sensors which are configured to collect environmental data. As an example, the multimedia content may be picture of Empire State Building tagged in the data source as "New York Trip". The location variable may be "New York". The time variable would include the time that the picture was saved in the data sources.

In an embodiment, the collection of the environmental variables is subjected to a minimum predetermined threshold of repetitive signatures generated respective of the visual elements. As an example for this embodiment, only upon identification of a hundred of blue shirts in images extracted from Facebook® webpages a collection of environmental variables in association with these images is performed.

According to the disclosed embodiments, generated signatures of similar or matching visual elements are clustered. In an embodiment, two visual elements are considered similar if their predefined signatures overlap more than a predefined threshold, e.g., 50%. In one possible implementation, the generated signatures of similar or matching visual elements are clustered to create a concept (or a concept structure). A concept is a collection of signatures representing elements of the unstructured data and metadata describing the concept. Each concept is represented by one or more signature reduced clusters (SRCs). As a non-limiting example, a 'Superman concept' is a signature reduced cluster (SRC) of signatures describing elements (such as multimedia content elements) related to, e.g., a Superman cartoon: a set of metadata representing textual representation of the Superman concept. Techniques for generating concepts and concept structures are also described in U.S. Pat. No. 8,266,185 to Raichelgauz, et al., which is assigned to common assignee, and is incorporated hereby by reference for all that it contains.

As an example, visual elements of cars may be clustered into a first concept while visual elements of tracks may be clustered into a second concept. Concepts can created in lower granularity, e.g., all cars of a specific brand, etc. The metadata of the concept provides description of the clustered visual elements. It should be noted that metadata can generated for clustered visual elements even if such cluster is not in a form of a concept. An exemplary method for generating metadata is disclosed in U.S. patent application Ser. No. 12/348,888 filed Jan. 5, 2009 to Raichelgauz, et al., which is assigned to common assignee, and is incorporated hereby by reference for all that it contains.

In an embodiment, if a cluster is created, the environmental variable related to the visual elements (or the multimedia content that elements were extracted from) are corrected to determine if that are variables having common value (e.g., same or approximate the same location). If such correlation exists, a social trend is determined by associating the correlated variables and the cluster (or concept) of the visual element. The determined social trend is evaluated over time by continuously or periodically checking changes in variables' values collected for similar visual elements. It should be noted that in certain embodiments visual elements can be added to existing cluster (or concept) as such elements are extracted. This would allow if the trend continues, gains momentum, or loses momentum.

In an embodiment, the social trend is determined when the corrected variables meets a predetermined correlation threshold. The correlation threshold may be at least one of: time based, volume based, a combination thereof, and the like. In an embodiment, the threshold may be predetermined. For example, a threshold may be 1,000 variable values of the same location received within 24 hours. The predetermined correlation threshold may be a specific value or a predefined range.

The server 120 is configured to send data the determined trend to the database 150 for storage and/or more publishers (not shown) over the network 110. According to yet another embodiment, the context of the trend may be determined by the server 120 using, for example, the metadata of the concept or the cluster of visual elements.

Each of the server 120 and the SGS 130 are comprised of a processing unit, such as a processor, that is coupled to a memory. The processing unit may include one or more processors. The one or more processors may be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing unit may be coupled to the memory. In an embodiment, the memory contains instructions that when executed by the processing unit results in the performance of the methods and processes described herein below. Specifically, the processing unit may include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing unit to perform the various functions described herein. In some configurations, the processing unit may include an array of computational cored configured as discussed in detail below.

In certain embodiments, the server 120 may implement or be connected to a deep-content-classification (DCC) system configured to generate concept structures. An exemplary configuration of the DCC system is disclosed in the U.S. Pat. No. 8,266,185 Patent referenced above.

Figure 2:
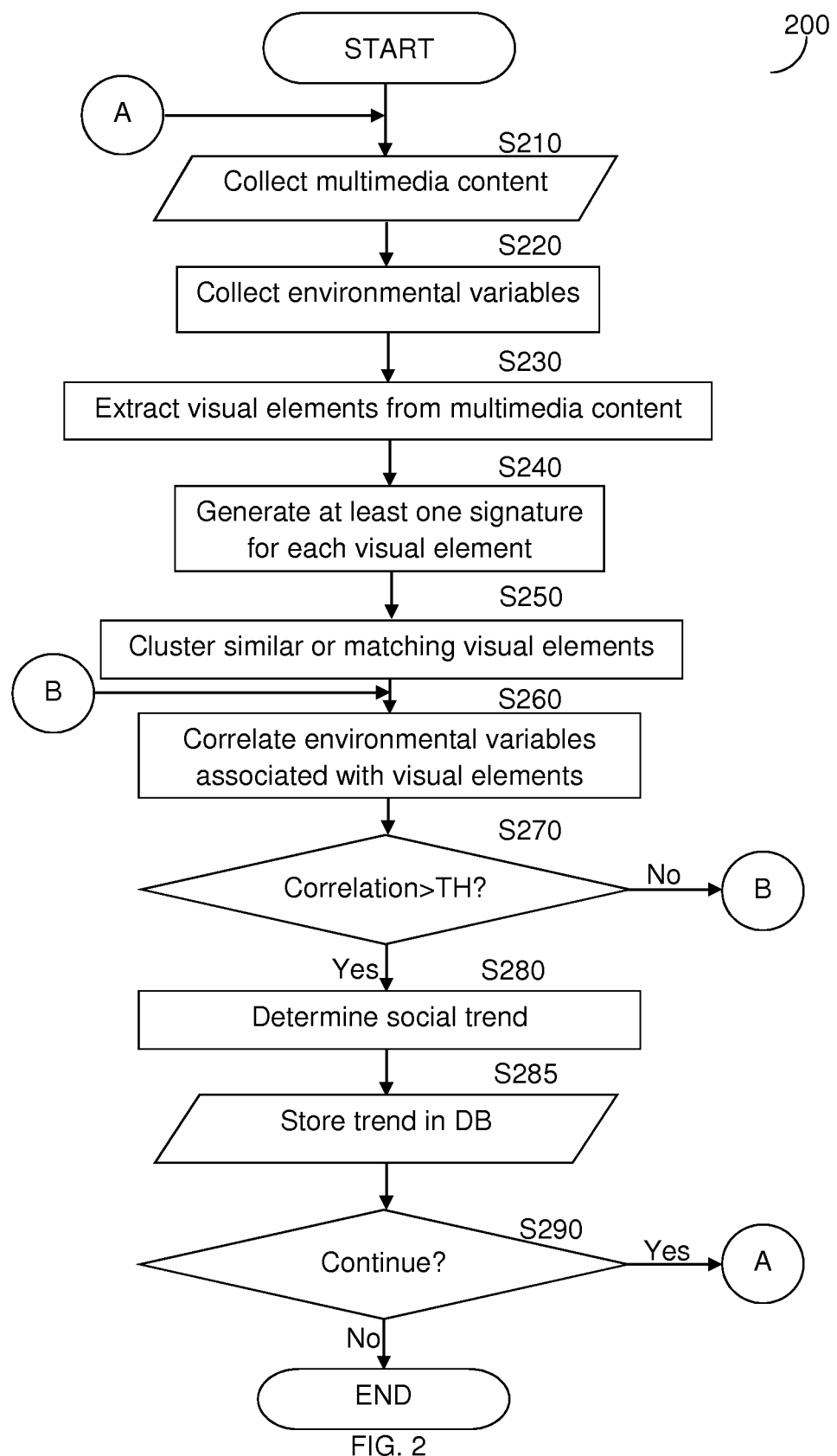
FIG. 2 is a flowchart describing a method for determining a trend in data sources according to one embodiment.

FIG. 2 depicts an exemplary and non-limiting flowchart 200 describing a method for determining social trends according to an embodiment. The method may be performed by the server 120. Without limiting the scope of the disclosed embodiment, the method will be discussed with reference to the various elements shown in FIG. 1. In S210, multimedia content is collected from data sources 140. The multimedia content may collected through a crawling process.

In S220, environmental variables associated with the collected multimedia content are also collected. Examples for such variables are provided above. In S230, visual elements are extracted from the collected multimedia content. In S240, at least one signature is generated for each extracted visual element. The generation of the at least one signature is further described herein below with respect to FIGS. 3 and 4. In an embodiment, the signatures are generated by the SGS 130.

In S250, using the generated signatures, similar or matching visual elements are clustered. In an embodiment, a concept is generated based on the clustered visual elements. It should be noted that the visual elements cannot be clustered, execution ends. Alternatively, the method continues a cluster or concept of visual elements is created.

In S260, environmental variables associated with virtual elements (or their respective multimedia content) are correlated. In an embodiment, the correlation is performed to detect environmental variables, received or recorded over a predefined time period, having the same or similar values.

In S270, it is checked whether the number of correlations of the environmental variables meets a predetermined correlation threshold. Examples for the predetermined correlation threshold are provided above. If so, execution continues with S280; otherwise, execution continues with S260. It should be appreciated that the method continues to receive and evaluate environmental variables until the correlation threshold is met. In an embodiment, a system administrator may terminate execution of the method.

In S280, a social trend is determined by associating the corrected environmental variables to the cluster or concept of the visual concepts as further described hereinabove with respect of FIG. 1. In optional S285, data respective of the determined social trend is sent for storage in the database 150 and/or publishers. It should be noted that upon determination of a social trend the respective created cluster and/or correlated variables can be evaluated periodically or continuously.

In S290 it is checked whether to continue with the operation of the method, and if so, execution continues with S210; otherwise, execution terminates.

Following is a non-limiting example for operation of the disclosed embodiments. The server 120 is configured to collect multimedia content from social media webpages, for example, Instagram® webpages. From the collected multimedia content, images uploaded by users of the webpage are extracted. The server 120 is also configured collect environmental variables, in this example, the locations of users who posted the images on Instagram® webpages.

The server 120 is then configured to query the SGS 130 to generate signatures respective of the images. The signatures are utilized to generate a concept indicating a repeated appearance of women wearing red hats. The server 120 is configured to correlate environmental variables of the images included in the concept. In this example, the correlation shows that the location is Japan. Upon determination that the repeated appearance of women wearing red hats in Japan crossed a predetermined volume threshold, it is determined as a social trend that women in Japan prefer to wear red hats.

Figure 3:
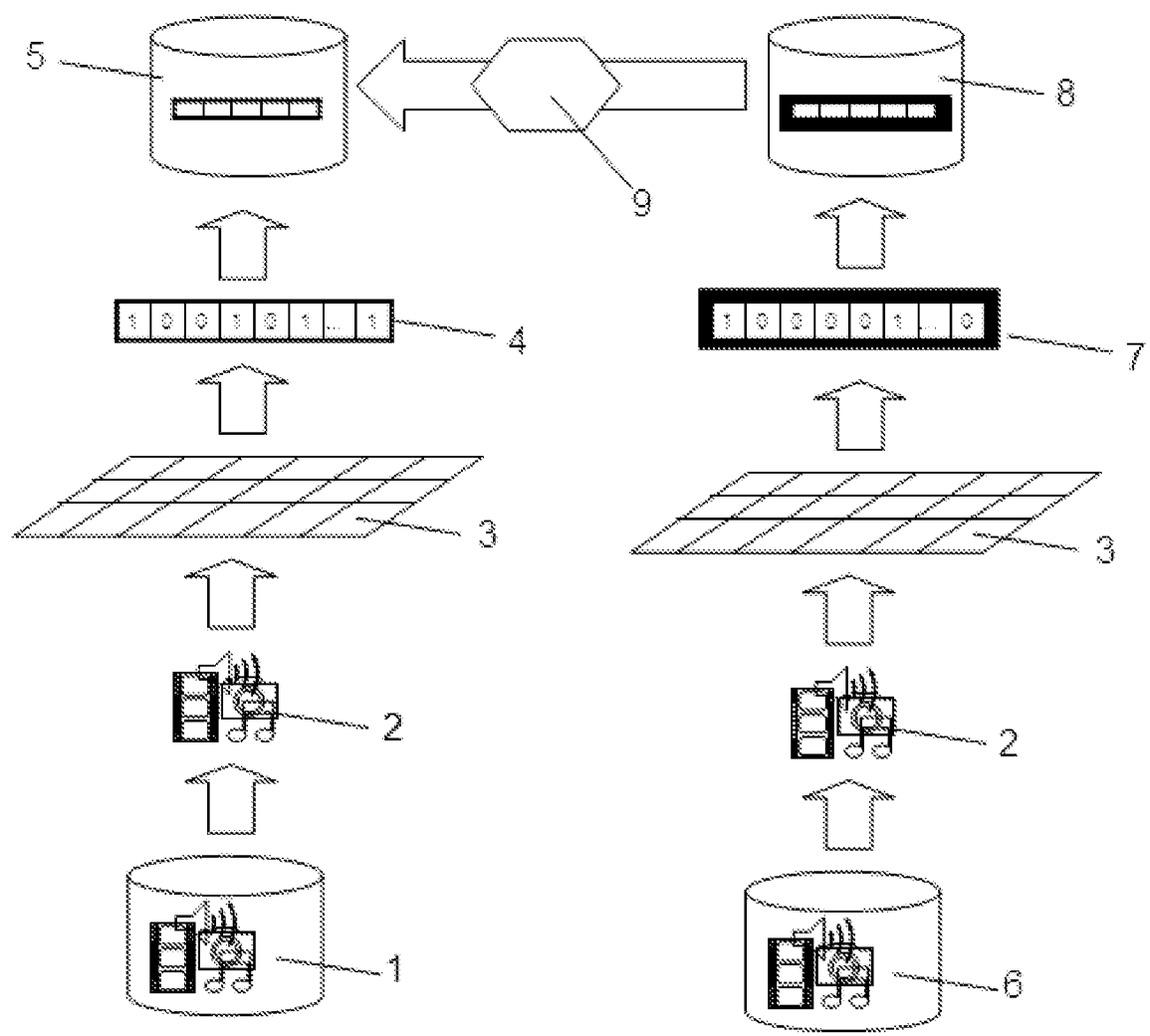
FIG. 3 is a diagram depicting the basic flow of information in a signature generator system.
Figure 4:
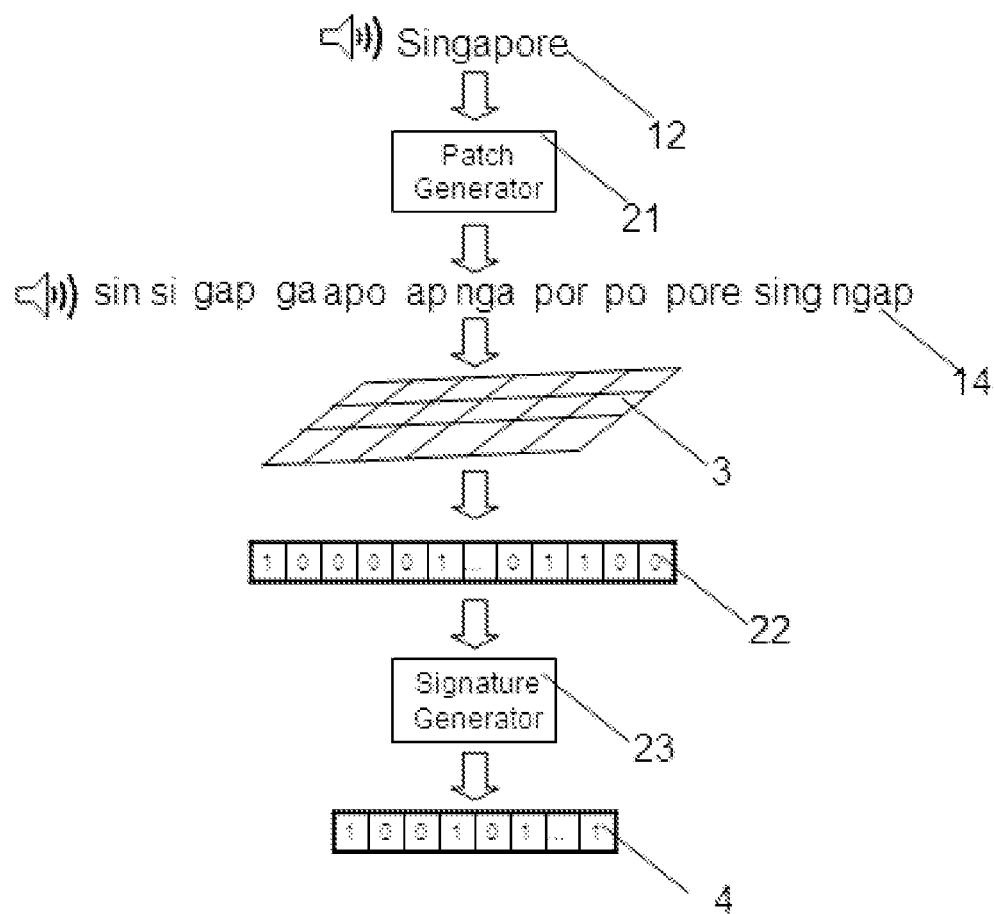
FIG. 4 is a diagram showing the flow of patches generation, response vector generation, and signature generation in a large-scale speech-to-text system.

FIGS. 3 and 4 illustrate the generation of signatures for the multimedia elements by the SGS 130 according to one embodiment. An exemplary high-level description of the process for large scale matching is depicted in FIG. 3. In this example, the matching is for a video content.

Video content segments 2 from a master database (DB) 6 and a target DB 1 are processed in parallel by a large number of independent computational cores 3 that constitute an architecture for generating the signatures (hereinafter the "Architecture"). Further details on the computational cores generation are provided below. The independent cores 3 generate a database of robust signatures and signatures 4 for target content-segments 5 and a database of robust signatures and signatures 7 for master content-segments 8. An exemplary and non-limiting process of signature generation for an audio component is shown in detail in FIG. 4. Finally, target robust signatures and/or signatures are effectively matched, by a matching algorithm 9, to master robust signatures and/or signatures database to find all matches between the two databases.

To demonstrate an example of signature generation process, it is assumed, merely for the sake of simplicity and without limitation on the generality of the disclosed embodiments, that the signatures are based on a single frame, leading to certain simplification of the computational cores generation. The matching system is extensible for signatures generation capturing the dynamics in-between the frames.

The signatures' generation process is now described with reference to FIG. 4. The first step in the process of signatures generation from a given speech-segment is to break down the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the server 120 and SGS 130. Thereafter, all the K patches are injected in parallel into all computational cores 3 to generate K response vectors 22, which are fed into a signature generator system 23 to produce a database of robust signatures and signatures 4.

In order to generate robust signatures, i.e., signatures that are robust to additive noise L (where L is an integer equal to or greater than 1) by the computational cores 3, a frame 'i' is injected into all the cores 3. Then, cores 3 generate two binary response vectors: $\vec{S}$ which is a signature vector, and $\vec{RS}$ which is a robust signature vector.

For generation of signatures robust to additive noise, such as White-Gaussian-Noise, scratch, etc., but not robust to distortions, such as crop, shift and rotation, etc., a core $C_i = \{n_i\}$ ($1 \le i \le L$) may consist of a single leaky integrate-to-threshold unit (LTU) node or more nodes. The node ni equations are:

$$V_i = \sum_j w_{ij} k_j$$

$$n_i = \prod (V_i - Th_x)$$

where, $\prod$ is a Heaviside step function; $w_{ij}$ is a coupling node unit (CNU) between node i and image component j (for example, grayscale value of a certain pixel j); $k_j$ is an image component 'j' (for example, grayscale value of a certain pixel j); Thx is a constant threshold value, where x is 'S' for signature and 'RS' for robust signature; and $V_i$ is a coupling node value.

The threshold values Thx are set differently for signature generation and for robust signature generation. For example, for a certain distribution of values (for the set of nodes), the thresholds for signature ($Th_S$) and robust signature ($Th_{RS}$) are set apart, after optimization, according to at least one or more of the following criteria:

1: For: $V_i > Th_{RS}$
$1 - p(V > Th_S) - 1 - (1-\varepsilon)^1 \ll 1$ i.e., given that l nodes (cores) constitute a robust signature of a certain image I, the probability that not all of these l nodes will belong to the signature of a same, but noisy image, Ĩ is sufficiently low (according to a system's specified accuracy).

2: $p(V_i > Th_{RS}) \approx l | L$ i.e., approximately l out of the total L nodes can be found to generate a robust signature according to the above definition.

3: Both robust signature and signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. The detailed description of the signature generation can be found in U.S. Pat. Nos. 8,326,775 and 8,312,031, assigned to common assignee, which are hereby incorporated by reference for all the useful information they contain.

A computational core generation is a process of definition, selection, and tuning of the parameters of the cores for a certain realization in a specific system and application. The process is based on several design considerations, such as:

(a) The cores should be designed so as to obtain maximal independence, i.e., the projection from a signal space should generate a maximal pair-wise distance between any two cores' projections into a high-dimensional space.

(b) The cores should be optimally designed for the type of signals, i.e., the cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The cores should be optimally designed with regard to invariance to a set of signal distortions, of interest in relevant applications.

Detailed description of the computational core generation and the process for configuring such cores is discussed in more detail in U.S. Pat. No. 8,655,801 referenced above.

The various embodiments disclosed herein can be implemented as hardware, firmware, software, or any combination thereof. Moreover, the software is preferably implemented as an application program tangibly embodied on a program storage unit or non-transitory computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for identifying social trends, comprising:
collecting multimedia content from a plurality of data sources; wherein the multimedia content comprises multiple images, the multiple images are acquired by multiple cameras;
sensing, by one or more sensors that differ from the multiple cameras, one or more environmental variables related to acquisitions of the multiple images;
extracting, by a server, visual elements from the multiple images;
generating at least one signature for each extracted visual element;
generating at least one cluster of visual elements by clustering at least similar signatures generated for the extracted visual elements;
collecting, by the server, the one or more environmental variables related to the acquisition of the multiple images only when a predetermined threshold of a repetitive signature related to a certain extracted visual element sensed at a certain location is generated;
correlating environmental variables related to visual elements in the at least one cluster; and
determining at least one social trend by associating the correlated environmental variables with the at least one duster.

2. The method of claim 1, wherein the one or more environmental variables are sensed by a weather information service or geo location system.

3. The method of claim 1, wherein the one or more environmental variables related to an image of the multiple images comprise a motion variable of a camera that captured the image, the camera belongs to the multiple cameras.

4. The method of claim 1, wherein the one or more environmental variables is a time of acquisition of an image of the multiple images.

5. The method of claim 1, wherein correlating the environmental variables further comprises: checking if the correlated environmental variables meet a predefined correlation threshold.

6. The method of claim 1, wherein the at least one cluster is a concept, wherein the concept is a collection of signatures representing visual elements and metadata describing the concept.

7. The method of claim 1, further comprising: evaluating the determined social trend over time.

8. The method according to claim 1 wherein the one or more environmental variables comprise locations, sensed by one or more GPS sensors, from which the multiple images were uploaded.

9. The method according to claim 1 wherein the one or more environmental variables are sensed by an accelerator.

10. The method according to claim 1 wherein the generating at least one signature for each extracted visual element is performed by independent computational cores that are implemented in hardware.

11. The method according to claim 1 wherein the generating of the at one cluster of visual elements comprises generating a signature reduced cluster by removing at least one signature from the cluster.

12. The method according to claim 1 wherein the predefined threshold is one hundred.

13. The method according to claim 1 wherein the at least one environmental variables comprises a time in which an image was stored in a data source.

14. The method according to claim 1 wherein the at least one environmental variables comprises a location from where an image of the multiple images is shared.

15. A non-transitory computer readable medium having stored thereon instructions for
collecting multimedia content from a plurality of data sources; wherein the multimedia content comprises multiple images, the multiple images are acquired by multiple cameras;
sensing, by one or more sensors that differ from the multiple cameras, one or more environmental variables related to acquisitions of the multiple images;
extracting, by a server, visual elements from the multiple images;
generating at least one signature for each extracted visual element
generating at least one cluster of visual elements by clustering at least similar signatures generated for the extracted visual elements;
collecting, by the server, the one or more environmental variables related to the acquisition of the multiple images only when a predetermined threshold of a repetitive signature related to a certain extracted visual element sensed at a certain location is generated;
correlating environmental variables related to visual elements in the at least one cluster; and
determining at least one social trend by associating the correlated environmental variables with the at least one cluster.

16. The non-transitory computer readable medium according to claim 15 wherein the one or more environmental variables are sensed by a weather information service or geo location system.

17. The non-transitory computer readable medium according to claim 15, wherein the one or more environmental variables related to an image of the multiple images comprise a motion variable of a camera that captured the image, the camera belongs to the multiple cameras.

18. The non-transitory computer readable medium according to claim 15, wherein the one or more environmental variables comprise locations, sensed by one or more GPS sensors, from which the multiple images were uploaded.

19. The non-transitory computer readable medium according to claim 15, wherein the one or more environmental variables are sensed by an accelerator.

20. The non-transitory computer readable medium according to claim 15, wherein the at least one environmental variables comprises a location from where an image of the multiple images is shared.

* * * * *